United States Patent
Hohberg et al.

(10) Patent No.: US 10,093,084 B2
(45) Date of Patent: Oct. 9, 2018

(54) LAMINATING PROCESS EMPLOYING GRID-LIKE ADHESIVE APPLICATION

(71) Applicant: Jowat SE, Detmold (DE)

(72) Inventors: Thomas Hohberg, Bielefeld (DE); Andreas Dandl, Laufen (DE)

(73) Assignee: JOWAT SE (DE)

( * ) Notice: Subject to any disclaimer, the term of this patent is extended or adjusted under 35 U.S.C. 154(b) by 0 days.

(21) Appl. No.: 15/622,651

(22) Filed: Jun. 14, 2017

(65) Prior Publication Data

US 2017/0282529 A1 Oct. 5, 2017

Related U.S. Application Data

(63) Continuation-in-part of application No. 14/684,641, filed on Apr. 13, 2015, which is a continuation-in-part of application No. 14/631,225, filed on Feb. 25, 2015.

(30) Foreign Application Priority Data

Feb. 26, 2014 (DE) .......................... 10 2014 002 568
Apr. 14, 2014 (EP) ...................................... 14164625

(51) Int. Cl.
  *B32B 7/14* (2006.01)
  *B32B 37/12* (2006.01)
  (Continued)

(52) U.S. Cl.
  CPC ...... *B32B 37/1292* (2013.01); *B29C 63/0047* (2013.01); *B32B 7/14* (2013.01);
  (Continued)

(58) Field of Classification Search
  CPC ................ C09J 2201/28; B32B 37/003; B32B 37/1292; B32B 7/14
  (Continued)

(56) References Cited

U.S. PATENT DOCUMENTS 4,548,846 A 10/1985 Kurtz
4,822,663 A 4/1989 Reott
(Continued)

FOREIGN PATENT DOCUMENTS

DE 10230109 A1 2/2004
DE 102014002568.3 2/2014
(Continued)

OTHER PUBLICATIONS

Machine Translation of German Patent 10240109; Date unknown.

*Primary Examiner* — Carson Gross
(74) *Attorney, Agent, or Firm* — Renner Kenner Greive Bobak Taylor & Weber

(57) ABSTRACT

The present invention relates to a process for laminating components with sheets, in which an adhesive is applied to the surface of the laminating sheet and/or of the component in a grid-like manner, so that, after the sheet and the component are joined, the adhesive is arranged between the sheet and the component, and the regions between the applied adhesive form a channel system that enables the removal of the air that is present between the component and the sheet. The invention further relates to a laminated molded part obtainable by the above-outlined process. The use of an adhesive grid provided between a component and a laminating sheet results in a reduction or prevention of air inclusions when the component is laminated with a laminating sheet.

15 Claims, 5 Drawing Sheets

(51) Int. Cl.
  *B32B 37/10*   (2006.01)
  *B32B 27/08*   (2006.01)
  *B32B 27/20*   (2006.01)
  *B32B 27/28*   (2006.01)
  *B32B 27/30*   (2006.01)
  *B32B 27/32*   (2006.01)
  *B32B 27/36*   (2006.01)
  *B32B 27/40*   (2006.01)
  *B32B 37/00*   (2006.01)
  *B29C 63/00*   (2006.01)
  *C09J 5/00*    (2006.01)
  *B32B 37/18*   (2006.01)
  *B29C 63/48*   (2006.01)
  *B29K 655/00*  (2006.01)

(52) U.S. Cl.
  CPC ............. *B32B 27/08* (2013.01); *B32B 27/20* (2013.01); *B32B 27/285* (2013.01); *B32B 27/304* (2013.01); *B32B 27/308* (2013.01); *B32B 27/32* (2013.01); *B32B 27/365* (2013.01); *B32B 27/40* (2013.01); *B32B 37/003* (2013.01); *B32B 37/1018* (2013.01); *C09J 5/00* (2013.01); *B29C 2063/485* (2013.01); *B29K 2655/00* (2013.01); *B29K 2671/02* (2013.01); *B32B 37/18* (2013.01); *B32B 2262/101* (2013.01); *B32B 2262/106* (2013.01); *B32B 2307/724* (2013.01); *B32B 2309/68* (2013.01); *B32B 2355/00* (2013.01); *B32B 2605/00* (2013.01); *B32B 2605/003* (2013.01); *C09J 2201/28* (2013.01); *C09J 2400/226* (2013.01)

(58) Field of Classification Search
  USPC .......................................................... 156/87
  See application file for complete search history.

(56) References Cited

U.S. PATENT DOCUMENTS

| | | |
|---|---|---|
| 5,650,215 A | 6/1997 | Mazurek et al. |
| 6,197,397 B1* | 3/2001 | Sher ........................... C09J 5/08 428/42.3 |
| 2003/0064190 A1* | 4/2003 | Carte .................... A61F 13/023 428/40.1 |
| 2008/0196822 A1 | 8/2008 | Satoh et al. |
| 2009/0215351 A1 | 8/2009 | Kobayashi et al. |
| 2012/0121849 A1 | 5/2012 | Karabatsos |
| 2013/0068367 A1* | 3/2013 | Mikami .................. B44C 1/105 156/60 |

FOREIGN PATENT DOCUMENTS

| | | |
|---|---|---|
| EP | 2535179 A1 | 12/2012 |
| EP | 2551236 | 1/2013 |
| KR | 10-2011-0026567 | 3/2011 |
| WO | 2003103853 | 12/2003 |

* cited by examiner

LAMINATING PROCESS EMPLOYING GRID-LIKE ADHESIVE APPLICATION

CROSS REFERENCE TO RELATED APPLICATIONS

The present application is a continuation-in-part of U.S. patent application Ser. No. 14/684,641 filed Apr. 13, 2015, now abandoned; and the present application is also a continuation-in-part of U.S. patent application Ser. No. 14/631,225 filed Feb. 25, 2015, pending, the disclosures of which are incorporated herein by reference.

TECHNICAL FIELD

The present invention relates to a process for laminating components with sheets, in which an adhesive is applied to the surface of the laminating sheet and/or of the component in a grid-like manner, so that, after the sheet and the component are joined, the adhesive is arranged between the sheet and the component. A channel system is formed between the regions of the applied adhesive formed by the application of the adhesive in a grid-like manner. The formation of the channel system facilitates the uniform removal (extraction)) of air that is present between the component and the sheet by the application of a reduced pressure.

The present invention further relates to a laminated molded part obtainable by the above-outlined process. The use of an adhesive applied in a grid-like manner between a component and a laminating sheet ensures the reduction or prevention of air inclusions when the component is laminated with a laminating sheet.

PRIOR ART

The lamination of components by applying reduced pressure or a vacuum, such as vacuum lamination or variants thereof, such as the in-mold graining (IMG) method, and/or by applying a pressing force is widespread in industry.

United States published application US 2012/121849 discloses a method for the manufacture of a laminated molded part from a component and a laminating film, wherein the bonding of the laminating sheet with the component is conducted by pressing the air present between the component and the sheet out through the channels by applying a pressing force. The adhesive between the component and the laminating film can be applied in an irregular pattern.

In vacuum-aided laminating methods, an air-impermeable or partially air-impermeable material (e.g., a decorative sheet) is generally laminated onto a solid component. The adhesive employed may be applied to the sheet or component as a preliminary coating.

In this process, the sheet may be heated and then applied to the component by providing a reduced pressure. The heat energy necessary for deforming the sheet can also be utilized for activating the adhesive. A critical precondition for the process is the air permeability (vacuum susceptibility) of the substrate (component) to be laminated in combination with the air-impermeability of the sheet. The latter property can also be achieved, for example, by an additional membrane.

While vacuum susceptibility usually exists with porous materials such as wood materials or open-pore composite materials, particular precautions must be taken for air-impermeable component materials (as typically produced in an injection molding method), or for partially air-permeable component materials, such as particular fiber composites. Such measures usually include the introducing of vacuum holes and the application of a lamination grain to the component, which allows for the extraction of the air present between the sheet and the component. The lamination grain gives rise to grain grooves in the component, through which the air present between the component and sheet can be extracted.

The vacuum holes enable the air between the sheet and the component to escape by applying a reduced pressure or vacuum. However, this is often not sufficient to avoid small- to medium-sized air inclusions. These may form, for example, as a result of the geometry of the components, but also through the sheet laying process and the limited capacity of the vacuum holes. Therefore, it is usual in the prior art that a lamination grain which, even after the "first contact" of the sheet with the component, enables the further transport of air through the grooves of the graining to the holes be additionally applied to the component. However, the application of such a lamination grain to the component is technically complicated and cost-intensive, especially since a sufficient grain typically requires a depth of 0.2 to 0.3 mm, thus resulting in a correspondingly higher amount of material being employed and an increase in the total weight of the component. Ultimately, this may constitute up to 10% of the weight of the component.

In the automobile field, and in particular in respect of components of the interior trim of vehicles, two different processes are typically employed in practice for sheet lamination. In a first process, the adhesive is applied by spraying onto the component. In this case, a paint-like adhesive must be avoided because this could result in the vacuum holes being clogged by the adhesive (e.g., when a dispersion or solvent adhesive is used).

In an alternative method, the adhesive (e.g., a hot-melt adhesive) is applied to the sheet. In this case, the hot-melt adhesive is heated together with the sheet to the necessary deformation temperature typical of such sheets (from 120 to 210° C., depending on the sheet), and thus activated. With this alternative method, the adhesive (usually a reactive or thermoplastic hot-melt adhesive) is a viscous fluid. This is still true during the vacuum joining process. Due to its fluidity, the viscous adhesive can very easily clog the vacuum holes of the grain grooves. This prevents the uniform extraction of air and can thus facilitate the formation of air inclusions. This leads to visible and also invisible flaws in the finished laminated molded part.

In fact, the skilled person knows that such flaws formed by air inclusions frequently occur when hot-melt adhesives are used, and the requirements in terms of grain quality and depth and the number of holes are higher than those for the first mentioned process, in which the adhesive is sprayed onto the component.

Thus, there is a need in the art to provide a laminating process for components in which the formation of air inclusions or flaws is substantially, and preferably completely, prevented.

In addition, the needed process should also be suitable for components not possessing elaborate gravures/grains to thus enable, inter alia, a more cost-effective process (e.g., through the use of injection molds without grain structure, less wear of the injection mold), lower component weights, simpler correction of components (no need to consider the grain), and the use of materials that are either not or only poorly engraveable, such as fiber composites. The process should further enable a reduction of the number of vacuum holes in the component, and avoid incomplete cross-linking when reactive adhesives are used, which occurs when the moisture-reactive adhesive has insufficient contact with air and, thus, with moisture.

SUMMARY OF THE INVENTION

As employed herein, the term "comprising" is to be understood to also cover the alternative in which the product/method/use in respect of which the term "comprising" is used may also "consist exclusively of" the subsequently-described elements.

Unless otherwise indicated, all percent values, ppm values and parts values described are done so are on a weight basis based on the total weight of the entire composition.

Since all numbers, values and/or expressions specifying quantities of materials, ingredients, reaction conditions, molecular weights, number of carbon atoms, and the like, used herein and in the claims appended hereto, are subject to the various uncertainties of measurement encountered in obtaining such values, unless otherwise indicated, all are to be understood as modified in all instances by the term "about."

The process, polymers and compositions of the present invention may suitably consist (only) of, or consist essentially of the process delineations, components and elements described herein. The invention illustratively disclosed herein suitably may be practiced in the absence of any element which is not specifically disclosed herein or disclosed herein as being essential.

Where a numerical range is disclosed herein, such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10. It is to be understood that the upper and lower amount, range, and ratio limits set forth herein may be independently combined. Similarly, the ranges and amounts for each element of the invention can be used together with ranges or amounts for any of the other elements.

The "lamination sheet" may be a plastic sheet, preferably a plastic sheet based on polyvinylchloride (PVC), polyolefins, thermoplastic polyolefins (TPO), polycarbonate, polyethers, polyesters, polyurethanes, polymethacrylates, or combinations of copolymers and terpolymers thereof. But other (decorative) materials are suitable, such as foam sheets, textiles, metal sheets, real leather, artificial leather and layered composites of several of the above materials. In this case, air tightness can achieved through the use of additional membranes.

The lamination sheet preferably has a thickness in the range of 0.1 mm or more and 7.0 mm or less, preferably 1.0 mm or more and 3.5 mm or less, more preferably 1.5 mm or more and 2.5 mm or less.

In particular, the plastic sheets include sheets based on polyolefins such as polypropylene and polyethylene. In addition, sheets based on polyester, polyamide, polycarbonate, polyvinyl chloride, polymethyl methacrylate and polystyrene are preferred. By polyolefins such as polyethylene and polypropylene, is not only to be understood ethylene and propylene homopolymers but also copolymers with other olefins such as acrylic acid or 1-olefin. Thus, by polyethylenes is to be understood in particular ethylene copolymers with 0.1 to less than 50 wt.-% of one or more olefins such as propylene, 1-butene, 1-pentene, 1-hexene, 1-octene, 1-decene or 1-dodecene, with propylene, 1-butene and 1-hexene being preferred. By polypropylenes is to be understood in particular propylene copolymers with from 0.1 to under 50 wt.-% ethylene and/or one or more 1-olefins such as 1-butene, 1-pentene, 1-hexene, 1-octene, 1-decene or 1-dodecene, whereby ethylene, 1-butene and 1-hexene are preferred. By polypropylene is preferably to be understood substantially isotactic polypropylene.

Polyethylene sheets may be made from HDPE or LDPE or LLDPE. In embodiments wherein the sheet is a polyamide sheet, those derived from nylon 6 are preferred. In embodiments wherein the sheet is a polyester sheet, those of polybutylene terephthalate and especially polyethylene terephthalate (PET) are preferred. In embodiments wherein the sheet is a polycarbonate sheet, those derived from polycarbonates and produced using bisphenol A are preferred. In embodiments wherein the sheet is a sheet made of polyvinyl chloride, those made of rigid polyvinyl chloride or plasticized polyvinyl chloride, whereby soft polyvinyl chloride also includes copolymers of vinyl chloride with vinyl acetate and/or acrylates are preferred.

Plastic sheets according to the present invention may also include composite sheets; for example, sheets comprising one of the above-mentioned sheets, and a metal sheets or fiber sheets.

A solvent-free melt adhesive is preferably used as the "adhesive". This covers water and solvent-free adhesives that are solid, in particular, at room temperature (21° C.+/−1° C.), and which are applied to the materials to be bonded from the melt and that, after assembly, physically and/or chemically set on cooling.

However, there are also suitable pressure-sensitive adhesives, dispersion adhesives, solvent adhesives, for example, based on polyurethane, polyacrylate, ethylene vinyl acetate (EVA), polyvinyl acetate (PVAc), styrene-isoprene-styrene copolymer (SIS), styrene-butadiene-styrene copolymer (SBS), or chloroprene rubber (CR). Suitable melt adhesives, depending on the requirements, may in particular be melt adhesives in thermoplastic or reactive qualities.

The hot melt adhesives used are selected in particular as a function of the materials to be bonded and the related specific requirements, such as the required temperature or heat resistance of the bond, etc.

Suitable thermoplastic hot melt adhesives may include those in particular based on ethylene vinyl acetates (EVA), polyolefins (e.g. amorphous poly-alpha-olefins or metallocene-catalytically produced polyolefins), polyacrylates, co-polyamides, copolyesters and/or thermoplastic polyurethanes, while corresponding copolymers and/or terpolymers may be used. Metallocene-catalytically produced polyolefins are particularly preferred, as they have an increased freedom from tackiness.

In embodiments wherein the adhesive is a reactive melt adhesive, for example moisture-curing, such as those based on silane-grafted amorphous poly-alpha-olefins, silane-grafted metallocene-catalytically prepared polyolefins (see EP 1508579 AI) or isocyanate-terminated polyurethanes are preferred. In the case of reactive hot melt adhesives, the subsequent crosslinking with moisture leads to temperature or heat-resistant adhesive bonding. Reactive hot melt adhesives thus combine the advantages of rapid initial strength through the physical setting process of cooling with a subsequently occurring chemical crosslinking. The melt must be protected from moisture before its application in the processing of moisture reactive hot melt adhesives.

Polymers that are suitable for the purposes of the present invention include reactive moisture-curing hot melt adhesives that are commercially available as silane-modified poly alpha-olefins, for example, under the product designation "Vestoplast® 206" from Degussa AG, Marl, Germany. In one embodiment of the present invention, silane-modified poly-alpha-olefins, with average molecular weights Mn from 5,000 to 25,000 g/mol, preferably 10,000 to 20,000 g/mol are used.

As described below in more detail, reactive hot melt adhesive additives on the basis of non-reactive polymers resins and/or waxes may be added to control the open time and or the adhesion properties: also optionally hydrogenated rosin ester and aliphatic hydrocarbon resins.

The application of the adhesive to the surface of the sheet and/or the component, preferably exclusively on the surface of the sheet, is carried out, as described above, in the temperature range of 90° C. or more and 220° C. or less, preferably 120° C. or more and 190° C. or less.

In order to achieve good coat-ability of the hot-melt adhesive, hot melt adhesives are commonly used that, at processing temperatures of generally 90° C. to 200° C., have Brookfield viscosities in the range of generally 50 to 1,000,000 mPa·s.

For example, preferably in accordance with the invention, reactive hot melt adhesives based on silane-grafted polyolefins, especially silane-grafted poly-alpha-olefins, are used, which at 180° C. have Brookfield viscosities in the region of 50 to 50,000 mPa·s, especially from 1,000 to 10,000 mPa·s, preferably 5,000 to 8,000 mPa·s, more preferably 5,500-7,500 mPa·s.

To control the reactivity and the crosslinking behavior, all the common catalysts can usually be added to the reactive hot melt adhesives, e.g. dibutyltin dilaurate (DBTL), and in the industry-standard quantities for this purpose. Examples of catalysts suitable for the present invention include the most common and well-known adhesive chemical catalysts, such as organic compounds, such as the aforementioned dibutyltin dilaurate (DBTL) or alkyl mercaptide compounds of dibutyltin, or organic iron, lead, cobalt, bismuth, antimony and zinc compounds, as well as mixtures of the aforementioned compounds or amine-based catalysts such as tertiary amines, 1,4-diazabicyclo[2.2.2]octane and dimorpholinodiethyl ether and also mixtures thereof. According to the invention, dibutyltin dilaurate (DBTL) is particularly preferred, especially in combination with adhesives based on the aforementioned reactive, preferably silane-modified poly-alpha-olefins. The amounts of catalyst(s) employed may vary widely; most preferably, the amount of catalyst used is from 0.01 to 5 wt. %, with respect to the adhesive. In order to control the application properties of the adhesives, further additives may also be added, such as plasticizers, high-boiling organic oils or esters or other additives serving for plasticizing, stabilizers, antioxidants, acid scavengers, fillers, anti-aging agents and the like.

To control the open time and/or adhesion properties of the above-mentioned adhesives, especially with respect to improved handling, other additives on the basis of non-reactive polymers, resins and/or waxes may also be added to the aforementioned hot melt adhesives. In this way, the adhesive properties may be adapted to the application—tailor-made in a manner of speaking.

In one or more embodiments where non-reactive polymers are used, they may for example be selected from the group consisting of (i) ethylene vinyl acetate copolymers or terpolymers, especially those with vinyl acetate contents between 12 and 40 wt.-%, more preferably 18 to 28 wt. %, and/or with melt indices (MFIs, DIN 53735) from 8 to 800, preferably 150 to 500; (ii) polyolefins, such as unmodified amorphous poly-alpha-olefins, in particular having average molecular weights Mn from 5,000 to 25,000 g/mol, preferably 10,000 to 20,000 g/mol, and/or with softening ranges using the ring and ball method between 80° C. and 170° C., preferably between 80° C. and 130° C., or unmodified metallocene-catalytically produced polyolefins (see DE 103 23 617 AI.); and (iii) methacrylates such as styrene methacrylates and also mixtures of these compounds.

In one or more embodiments where non-reactive resins are used, these may in particular be selected from the group consisting of hydrocarbon resins, especially aliphatic, cyclic or cycloaliphatic hydrocarbon resins, modified or unmodified rosin resins (e.g. rosin resin esters), terpene-phenolic resins, cumarone indene resins, methyl styrene resins, polymerized tall resin esters and/or ketone aldehyde resins.

In one or more embodiments where non-reactive waxes are used, polyolefin waxes such as polyethylene and polypropylene waxes or waxes modified on this basis may be used.

Preferably, the "carrier member" to be laminated for the "laminated molded part" to be produced, is made of a material selected from materials on the basis of natural fiber reinforced polymer materials, for example a natural fiber, such as a flax-polypropylene material, natural fiber, for example, a pure flax or a natural fiber, for example flax epoxide resin material, as well as a carrier member made of polypropylene (PP), styrene-isoprene-styrene co-polymer (ABS), polycarbonate ABS (PCABS), polycarbonate (PC), thermoplastic polyurethane (TPU), thermoplastic polyolefin (TPO) or polyamide produced by means of an injection molding process.

Particularly preferred are materials produced through plastic injection molding from acrylonitrile butadiene styrene (ABS), polycarbonate ABS (PCABS), polypropylene (PP), polycarbonate (PC), thermoplastic polyolefin (TPO), fiber composites comprising natural fiber PP, glass fibers, carbon fibers, synthetic fibers, mineral fillers, binding agents PP, polyurethane resin, phenolic resin, or combinations thereof.

The components may have a grain. Preferred, however, are components with no grain or a grain unsuitable for the extraction of air (this is, for example, the case with a grain that is too flat).

Furthermore, the components are preferably rigid and/or air-tight or partially permeable to air and/or vacuum permeable.

In the context of the present invention, various lamination tests were performed on smooth, un-grained components using a TPO foam sheet that is commonly used in the automotive sector, whereby various component geometries, adhesive gravure (on the TPO film), lamination parameters and as well as various numbers and types of holes and hole locations in the component were tested. The component material and the adhesive were so selected that the adhesive had only limited adhesion to the components in order to facilitate the removal of the laminated sheet and thus permit an accurate evaluation of the bonded joint. The analysis of the components laminated according to the invention showed perfect bonding without any air pockets.

In fact, the channels resulting from the adhesive coating were still recognizable in the laminated molded part. In this way, for example, it was possible to avoid the dreaded incomplete or slowed cross-linking of the adhesive in areas without air contact in the case of humidity cross-linked reactive adhesives.

In general, the inventive method is carried out in such a way that the joining together of the lamination sheet and the component after application of the lamination sheet and/or the component is effected with the adhesive by applying a negative pressure (or a vacuum) and/or by means of pressure. The bonding by means of pressure is affected, for example, by pressing the sheet onto the component or by pressing the component into the sheet, whereby the sheet receives a hard or elastic impression, whose shape reflects the construction of the component in the sheet.

The adhesive is preferably on a surface of the lamination sheet that will face the laminated substrate in the following step. The lamination sheet coated with the grid-shaped adhesive may be placed on the component immediately and subsequently laminated or, alternatively, stored and used later for the lamination. In the latter case, the sheet precoated with adhesive is then preferably stable when stored. This also means that it is not prevented from being in the form of rolled goods when being stored or transported, and that it retains the properties of the adhesive during storage and transport.

The bonding by means of vacuum is usually carried out by applying a vacuum via the edge of the component or via openings arranged in the component, through which a vacuum can be created (so-called vacuum holes). The number of vacuum holes is adapted to the size and geometry of the component and the adhesive application used. Preferably, at least one vacuum hole is located in the component. In further embodiments according to the invention, two, three, four or even more openings are arranged in the base part (i.e. in the substrate or carrier member).

Preferably, the bonding of the lamination sheet and the component is carried out under heating, in particular above the melting or softening range of the adhesive.

According to a particularly preferred embodiment, a suitable hot melt adhesive with a grid pattern is first applied to the lamination sheet and assembled together with the component to be laminated. In this case, the hot melt adhesive is usually heated above its melting or softening temperature before and/or during the assembly of the lamination sheet and the component, so that a secure adhesive bond is ensured between the lamination sheet and the component.

To ensure a secure bond between the lamination sheet on the one hand and the component on the other, in conjunction with good processing properties, such as optical properties, etc., the adhesive is preferably used or applied in an amount of 10 g/m2 or more and 200 g/m2 or less, preferably 50 g/m2 or more and 100 g/m2 or less.

After application, the adhesive covers preferably 40% or more and 99% or less of the total surface area of the sheet and/or of the component, preferably the sheet provided with the adhesive grid, particularly preferably 60% or more and 90% or less, most preferably 70% or more and 85% or less.

The application of the adhesive can be carried out under heating, typically by melting at temperatures in the range of 40° C. or more and 220° C. or less, especially 120° C. or more and 190° C. or less.

In a preferred embodiment of the method according to the invention, this is affected by heating the lamination sheet coated with the adhesive before and/or during the bonding with the component. Alternatively, the component can be heated.

The "B side" is the side of the lamination sheet that should face the carrier member.

However, the decisive inventive concept of the first aspect of the present invention is the sequence of the three steps taken together: First, the adhesive must be applied to the B side of the sheet. Then, in a separate step the already-applied adhesive, i.e. in the direction of passage through the machine, directly or indirectly, is then reshaped and a macroscopic structure applied, i.e. a "grid"; then the bonding between the lamination sheet and the carrier member is affected only via the already-shaped adhesive.

The method presented here offers the advantage of enabling existing plant components to be used in an appropriate embodiment, i.e. for example, an existing device for applying adhesive in a conventional manner.

Only through the additional shaping step can there be created in the plastic and/or in the adhesive, the complicated geometries that can serve as channels during the lamination process. An existing plant can thus be upgraded cost-effectively to offer high quality work.

It should be expressly understood that within the scope of the present invention, the indefinite articles and numerical data such as "one", "two", etc. should generally be understood to be minimum figures, i.e. as "at least one . . . " "at least two . . . " and so on, insofar as it is not possible for a person skilled in the art, indirectly or technically, to infer from the relevant context that this should or could mean "exactly one . . . ", "exactly two . . . " etc.

According to a second aspect of the present invention, the object is achieved by a method for providing a lamination adhesive as a preliminary step in the method for producing a laminated molded part by means of a carrier member, the lamination sheet and the adhesive, whereby the adhesive should bond the B side of the lamination sheet and a surface of the carrier member, by means of the steps of (a) introduction of recesses in the B side of the lamination sheet, and (b) introduction of the adhesive into and/or between the recesses, whereby the order of these two steps may also be reversed.

Conceptually, this may be explained by the fact that a "recess" is singular, especially a number of single troughs or channels, whereby the recess is measured on the surface on the B side of the lamination sheet. In particular, the surface on the B side of the lamination sheet can be used as a reference value, in fact in the feed to the station or the tool for introducing the recesses. Thus, it is conceivable that the sheet on the B side is smooth and the tool for introducing the recesses is fed. On introducing the recesses, a plurality of troughs or channels are then pressed into the B side, either through direct contact-type mechanical loading or the application of high or low pressure.

On one hand it can be advantageous to introduce the adhesive into the recess. This means that the lamination sheet with the adhesive contained in the recesses could be easily transported further without the risk of an excess of adhesive being squeezed sideways or similar non-foreseeable rearrangements of the adhesive. On the other hand, the argument in favor of the introduction of the adhesive between the recesses means that in most cases it will be easier and can even be carried out using conventional tools. For example, one could use a conventional slot die, which according to the prior art would apply a completely flat smooth adhesive to a lamination sheet. Such a slot die is easily adjustable due to the previous experience of the operator so that the lamination sheet passing in the machine direction can be provided with adhesive in the plane of its passing surface. In such a case, a recess would either remain free of adhesive or at least would receive less adhesive. A reversal of the steps is also conceivable, so that the adhesive is applied first and then only after that are the recesses produced in the lamination sheet. The application of the adhesive may thus already take place in macro-structured channels, or a redistribution of the adhesive may be carried out on production of the recesses.

According to a third aspect of the present invention, the object is achieved by a method for providing a lamination sheet with adhesive as a preliminary step in the method for the production of a laminated molded part by means of a carrier member, the lamination sheet and the adhesive, whereby the adhesive bonds the B side of the lamination sheet and a surface of the carrier member through the following steps of (a) application of the adhesive through a slot die, (b) whereby the output of the adhesive through the slot die may be hindered by local resistances at the outlet in order to thereby form a grid.

This aspect of the invention is to be understood as follows: at least substantially uniform pressure is present at the side of the slot die for the discharge of the adhesive. Normally, the slot die has the same slot width over the entire length of the slot. Thus adhesive is discharged at the same speed and therefore with the same throughput at any point of the slot die, and then affixed to the lamination sheet.

However, this presupposes that the discharge flow of the adhesive over the entire width of the slot die is opposed by a uniform resistance.

However, if the resistance across the width of the slot die is changed locally, then the volume flow of the discharged adhesive also changes.

For example, if the lamination sheet is transported more closely locally to the slot die or transported further away from it, and/or if the surface of the B side of the lamination sheet has a different surface tension across the width of the slot die and/or if, for example, a grid, a rod, a flap or another discharge cross-section modifier is moved locally in front of the slot die, and then moved away again, then all this leads to a grid-shaped application of adhesive on the lamination sheet.

According to a fourth aspect of the present invention, the object is achieved by a method for applying a hot melt to a lamination sheet and then laminating the latter onto a carrier member, whereby the hot melt is applied in a structured manner.

By the grid-shaped application of adhesive (gravure application) according to the present invention is to be understood in the present disclosure that a structured adhesive is provided primarily on one surface, to give channels or a channel system that are/is preferably contiguous between the individual adhesive applications. The adhesive is preferably applied in the form of dots and/or strips at predetermined intervals (i.e. in a certain grid). The channels (or channel system) so formed between the adhesive applications enable, after the assembly of the lamination sheet and the component, optimized suction or pressing out of any air present between the sheet and component. The suction of air takes place typically via the edge of the component or by applying a negative pressure/vacuum via vacuum holes arranged in the component. In particular, the continuous channels (channel system) allow a uniform escape of the air by suction and/or pressing out over the entire surface of the film-covered component, whereby this happens largely independently of the geometry of the component (for example, any existing radii). In addition, in the case of sheet lamination by application of pressure, the grid-shaped adhesive application forming the channel system is equally advantageous because the air present between the component and the sheet can be squeezed out uniformly over the entire surface of the component.

Surprisingly, it has also been found that the grid-shaped channel-forming structure of the adhesive application during the lamination process is sufficiently retained, and no melting away of the adhesive takes place. The type of adhesive used here is not particularly limited, so basically all lamination adhesives commonly used for sheet lamination may be used.

In addition, when using moisture-curing adhesives, the grid-shaped adhesive application allows sufficient contact with the surrounding air via the channels and thus the air humidity. Incomplete curing of the adhesive and thus the formation of voids without bonding is thereby avoided.

The grid-like application of adhesives, especially of hot melt adhesives, is known to the person skilled in the art. Typically, however, the grid-like application is only for the sake of reducing the amount of adhesive used, better anchoring of the adhesive in open substrates, such as foams, preparation of breathable laminates, e.g. for the lamination of breathable membranes in which a closed adhesive sheet is undesirable. However, the selective use of negative or positive pressure in the lamination process, especially for the reduction and prevention of air pockets, is unknown.

By the purposeful use of a specific gravure, whereby the adhesive is applied in a grid-shaped manner, areas are formed, especially linear areas with no (or significantly less) adhesive (so-called channels) that are retained sufficiently long in the lamination process so that a complete and extensive, i.e. even, removal of the air present between the sheet and the substrate is made possible through suction and/or pressing out the air.

Preferably, the channels retain their shape until the end of the lamination process and are thus also retained especially in the finished laminated molded part.

In principle, the geometry of the gravure or the grid is subject to no restrictions, insofar as it is ensured that sufficient channels are formed to enable the removal of the air by suction and/or pressing out, or access to sufficient air in the case of moisture-reactive adhesives (and thus the access of moisture to the adhesive).

Preferably, the adhesive is applied in the form of dots or strips, particularly preferably in the form of a truncated pyramid, polygon (for example, three-, four-, five-, six-, seven-, eight-, nine- or ten cornered), diamond-shaped, rectangular, oval, L-shaped, round or irregularly shaped adhesive applications, particularly in the form of a truncated pyramid adhesive application.

Furthermore, gravures may also be used that are sufficiently known to the person skilled in the art from the standard grain gravures of the component.

The adhesive applications (especially the truncated pyramidal adhesive applications) are preferably applied at a distance (measured on the substrate surface) of 0.1 mm or more and 10.0 mm or less, preferably 0.3 mm or more and 5.0 mm or less, more preferably 0.5 mm or more and 4.0 mm or less, most preferably 1.0 mm or more and 3.5 mm or less, particularly 1.5 mm or more and 2.5 mm or less.

The depth of the gravure, i.e. the thickness (height measured from the respective substrate surface) of the applied adhesive, is preferably in the range of 0.1 mm or more and 1.5 mm or less, particularly preferably 0.2 mm or more and 1.0 mm or less, most preferably 0.5 mm or more and 0.8 mm or less.

The adhesive dots are preferably applied in an irregular arrangement or in different areas of different, preferably irregular, arrangements, i.e. without the formation of longer linear channels. The formation of a secondary structure (i.e. a structure that is recognizable only by a certain regular arrangement of applied adhesive) is thus avoided, with the result that the appearance of the finished laminated component gives the impression of a particularly smooth surface. Of course, adhesive applied regularly in the form of geometric patterns, whose combinations or combinations thereof with irregularly applied adhesive are also possible. In addition, the application of the adhesive may be adapted to the shape and/or the surface of the molded part.

In particular components without any grain (or those with flat, typically unsuitable grain or a smooth surface) as well as components with few holes can be laminated by means of the channels shaped/formed by the adhesive grid. This results in a significantly reduced number of defects. In the preferred ideal case, the final product has no discernible defects.

If the adhesive is melted (e.g. when using hot melt adhesives), this does not spread flatly but forms individual drops in the presence of a suitable gravure, whereby the channels are preserved between the drops. These channels then allow uniform air transportation in the area between the component and the lamination film and thus the desired horizontal vacuum access (horizontal air transportation, i.e. removal of the air) within the adhesive grid.

Preferably, the hot melt is applied to form structured channel elevations, to form channels between the elevations through which air can be drawn along the film surface, whereby a diamond pattern is preferably produced.

In principle, however, the invention can work with either a positive application or a negative application of adhesive, i.e. either with application of the adhesive as a macro-structural elevation with the channels being formed between the pluralities of macro-structural elevations; or as channels formed through reshaping to produce the channels.

According to a fifth aspect of the present invention, the object is achieved by a process especially involving a method as described above to produce a laminated molded part by means of a carrier member, a lamination sheet and an adhesive, especially a hot melt, whereby the adhesive bonds a B side of the lamination sheet and a surface of the carrier member through the following steps of (a) grid-shaped application of adhesive to the B side of the lamination sheet and/or to the surface of the carrier member, whereby channels are formed by the grid-like application of the adhesive, either already on the first application or after re-shaping; (b) assembly of the carrier member and the lamination sheet so that the layer of the applied grid-shaped adhesive is arranged between the lamination sheet and the carrier member; and (c) bonding of the lamination sheet to the carrier member by (i) removal of the air present between the carrier member and the lamination sheet via the channels by applying a negative pressure and/or by (ii) pressing out the air present between the carrier member and the lamination sheet via the channels by applying positive pressure, whereby the method is characterized in that the lamination sheet is drawn off a roll as an endless sheet and/or that the adhesive is applied to a roller during the unrolling of the lamination sheet and/or that the adhesive is applied to the lamination sheet by means of a slot die and/or that the adhesive is applied inside a recess.

It should be clearly noted that the above-described aspects of the invention may be combined in any arrangement of the second, third, fourth or fifth aspects.

The same applies explicitly to all the features in connection with one of the aspects that has been described above or that will be described below. All of these may also be applied to any other aspect of this invention.

For a constructive embodiment, it is proposed that the lamination sheet should be guided around an embossing roller, whereby the surface of the embossing roller has structured protrusions and is thus able to emboss a channel pattern.

The feeding of the lamination sheet via rollers is useful because in most existing plants, there are already roller assemblies for feeding the lamination sheet web. In a rolling line, the lamination sheet web is guided under traction force to the rollers. If a roller has textured protrusions on its surface (referred to herein as an "embossing roller"), then the traction force may be applied in such a way, especially in combination with the heating of the embossing roller and/or the lamination sheet web, that the application of a structure is already possible in this way. Thus, for example the embossing roller may press channel-shaped gaps into a previously applied full-surface adhesive sheet; or the embossing roller may press recesses into the lamination sheet, especially before charging with adhesive.

Thus, it is entirely conceivable that the lamination sheet may be guided around an embossing roller, whereby the surface of the embossing roller has textured elevations enabling the impression of a plurality of recesses in the lamination sheet, either as a plurality of discrete unconnected recesses, or as a plurality of recesses connected in a channel system.

In the implementation of a method according to the invention, the lamination sheet may be led around a pressure roller, in particular after being led around an embossing roller, and guided past a slot die during its passage around the pressure roller.

While the lamination sheet web is passing around a roller, its location may be predetermined with very high accuracy. This makes it possible to set a slot die at an exactly predictable distance from the lamination sheet web. This enables the precise selection of both an introduction of the adhesive into recesses while simultaneously avoiding the non-recessed areas, or, alternatively, providing adhesive at least in the substantially full area of the non-recessed surfaces, while simultaneously avoiding the recessed areas.

It is also possible to use a conventional slot die, whereby only the distance from the passing lamination sheet web is set. Either a further roller is used in the existing rolling line, i.e. the embossing roller, or a roller is exchanged.

It is also conceivable that the adhesive is introduced into the macroscopic recesses in the lamination sheet, preferably flush with the surface and bonded with the B side of the lamination sheet, or via a flat application of the adhesive above the recesses.

A method which particularly exploits the properties of suitable plastics with memory effect, arranges that recesses are first formed in the lamination sheet, and then filled with adhesive and then the recesses are flattened so that the adhesive rises from the recesses to form a grid-like structure.

To flatten the recesses, the lamination sheet is preferably actively heated, especially by means of irradiation through heat lamps directed at the lamination sheet.

Irradiation through heat of suitable plastic materials with memory effect enables recovery of the original cast and stretched shape. So if, initially, recesses are introduced in the lamination sheet web by an embossing roller in a heated condition, for example by means of a directly-heated embossing roller, then a return of the recesses to the flat or at least flatter sheet web may be easily achieved by exposure to heat.

The recesses in the lamination sheet may be flattened from the outside via the memory effect in plastic without mechanical action. Alternatively, the recesses in the lamination sheet may be flattened by mechanical action on the A side.

In some circumstances, it may be desirable by means of an embossing roller, especially a grain roller, to provide an extended surface of a panel with a surface structure while avoiding a recess area, and later providing the panel with adhesive, whilst avoiding the recess area, i.e. by means of a designated waste area and/or in designated cut-off area and/or in a lamination sheet for a door panel.

Such features are especially of great advantage if the method is used in a method for manufacturing a laminated molded part.

The particularly desired suitability of a method as described above is found in the manufacturing of an interior trim part of a motor vehicle. According to a seventh aspect of the present invention, the object is achieved by a plant for laminating a carrier member with a lamination sheet, as well as with a station for applying adhesive to hold the lamination sheet on the carrier member, whereby the plant to implement the method is set up as described above.

By "station" is to be understood a tool that is adapted for applying the adhesive, whereby this station may be made of conventional components such as a slot die for applying adhesive to a lamination sheet web in a roller line.

In a preferred embodiment of the invention, there is first a stamping station for the lamination sheet, and only later, indirectly or directly, the station for applying adhesive arranged in a machine direction, i.e. in the designated flow direction of the lamination sheet through the plant.

This is particularly advantageous because the application of the adhesive on the lamination sheet may be effected mechanically from the already embossed surface of the lamination sheet on its B side. Thus, it is conceivable to use the embossed B side of the lamination sheet for the local alteration of the discharge resistance of a known slot die, so that the embossed surface on the B side of the lamination sheet provides a macroscopic structured grid-shaped adhesive application on the lamination sheet. In this way, the embossed recesses and the intervening non-recessed areas may result in either a later positive or negative adhesive, or channel formation.

If the embossing station has a deflection roller with a grid-shaped structured surface, then the embossing may be simply impressed into the surface of the B side of the lamination sheet and/or the adhesive in the roller line without tension.

The "grid-shaped structured surface" should be considered—exactly as in the case of the embossed lamination sheet—as a structure that leads to macroscopic embossing. Tolerated microscopic structuring as a result of technical production reasons or for reasons of economy should not be understood in this sense. Rather, the structure must have a channel structure of such a size, i.e. in width and depth, that the channels obtained in the manner described previously may use negative or positive pressure for the conduction of air both on the embossing roller as well as in lamination sheet and/or at least in the adhesive. In order to use as little force as possible in the embossing, it is proposed that the embossing station has a temperature roller.

A roller is then "tempered" when it preferably has a control for increasing the temperature relative to the ambient air. In particular, one should consider electrical contact heating, laser beam heating, or other radiant heating. The heater should preferably be arranged inside the roller so that the surface of the roller, i.e. that portion which comes into contact with the revolving lamination sheet, may be heated without having to influence the web run.

Due to the tempering, it is possible with the appropriate setting of the plant to introduce embossing in the lamination sheet, which leads to the recovery of the form of the lamination sheet through the memory effect of a plastic on retempering, whereby the recovery of the form of the plastic may be used for rearrangement and structuring of the adhesive.

The station for the application of the adhesive may have a slot die with an adhesive discharge. In particular, a station well-known from the prior art for applying adhesive may be used, whereby a slot die in the designated transport path of the lamination sheet may be precisely set so that the slot die is arranged to apply a uniform adhesive coating on the passing sheet.

By means of a modification of the film path and/or the slot die, the functionality required here for the locally changing adhesive application may be obtained.

It should be expressly understood that the application of adhesive and/or a shaping of the adhesive does not necessarily have to take place in a rotary tool and thus on the revolving film. Rather, it may also be affected for a stationary application and/or shaping, or a corresponding tool may be moved along with the sheet.

In the case of a slot die, preferably a distance setting is provided between an outlet of the slot die and a designated path of the lamination sheet.

This makes it possible to vary easily the amount of discharged adhesive. If the distance is greater, then a greater amount of adhesive is discharged; however, if the distance is smaller, then a reduced amount of adhesive will be discharged. If the distance is zero or almost zero, then only a very thin film of adhesive or not even a continuous film of adhesive will be discharged onto the areas facing the passing sheet at the slot die when blocked.

Regardless of this, the interplay between the outlet pressure of the adhesive and the distance between the die and the lamination sheet may be used to provide recessed areas or at least substantially non-recessed areas surface flatly with adhesive in such a way that the adhesive does not enter at all, or at least does not substantially enter the recessed areas. Such a coating of the lamination sheet with adhesive has been found to be particularly easy to adjust in recent prototype tests of the present invention. The discharge of the adhesive from the nozzle may preferably be without pressure.

It is proposed that a recess flattening station is arranged after the station for application of the adhesive and prior to the station for applying the adhesive-coated lamination sheet to the carrier member.

The recess flattening station should be arranged to flatten recesses in the lamination sheet, i.e. either to eliminate them completely or at least partly, but mainly to eliminate them. In a simple case, by means of mechanical action from the A side or B side of the lamination sheet, a recovery of the embossed recesses may be supported, for example by suction out of the recessed surface of the B side, or by means of a pressurized air effect against the recessed points from the A side.

If there is sufficient heat on the B side of the lamination sheet during the impressing of the macroscopic structure, recesses may be introduced so that the depth of the recesses on the B side is less than any elevation on the A side.

Preferably, however, the introduction of recesses on the B side is so performed that no elevations arise on the A-side. To achieve this, for example, the recess impressing tool may be opposed by a supporting device, for example, a smooth-faced pressure roller.

According to a further aspect of the present invention, this is achieved by a method for converting a plant with a slot die for applying adhesive to a moving lamination sheet to produce a laminated molded part through the following steps of: insertion of a device to produce a grid-shaped structural pattern on a B side of the lamination sheet, i.e. on the path from the introduction of the lamination sheet towards the slot die.

It is to be understood that an existing plant may be easily converted using the present invention presented here: the existing rolling line may also be further used with an existing slot die for applying adhesive. It only requires that somewhere in the plant, following the feeding of the lamination sheet into the plant and before the application of the adhesive, but also after the application of the adhesive, the means for production of the grid-shaped structure on the lamination sheet is installed, for example, by replacing an existing component such as primarily a guide roller.

It has surprisingly been found that the disadvantages of the prior art are overcome by the present invention. In particular, the present invention relates to the following items:

1. A process for preparing a laminated molded part from a component (alternatively referred to as a substrate) and a laminating sheet (alternatively referred to as a sheet), characterized by comprising the following steps:
   applying an adhesive in a grid-like manner to the surface of the laminating sheet and/or of the component, wherein channels are formed on the surface from the grid-like application of the adhesive;
   joining the component and the laminating sheet in such a way that the layer of the adhesive applied in a grid-like manner is arranged between the laminating sheet and the component; and
   bonding the laminating sheet with the component by extracting the air present between the component and the sheet through the channels by applying a reduced pressure or by pressing out of the air present between the component and the sheer via the channels by applying a positive pressure, or combination thereof.
2. The process according to item 1, characterized in that at least one vacuum hole through which the reduced pressure is applied is provided in said component.
3. The process according to either of items 1 or 2, characterized in that the adhesive is applied in dots or stripes, preferably in the form of truncated-pyramid-shaped, polygonal, diamond-shaped, rectangular, oval, L-shaped, round or irregularly-shaped adhesive deposits, more preferably in the form of truncated-pyramid-shaped or truncated conical-shaped adhesive deposits.
4. The process according to one or more of items 1 to 4, characterized in that the channels between the regions/sites of adhesive deposits remain free of adhesive during the grid-like application.
5. The process according to one or more of items 1 to 4, characterized in that said channels are maintained until the end of the laminating process.
6. The process according to one or more of items 1 to 5, characterized in that said adhesive is applied in an irregular pattern or in regions of irregular patterns.
7. The process according to one or more of items 1 to 6, characterized in that said adhesive deposits are provided at intervals of from 0.1 mm or more to 10.0 mm or less, preferably from 0.3 mm or more to 5.0 mm or less, more preferably from 0.5 mm or more to 4.0 mm or less, even more preferably 1.0 mm or more to 3.5 mm or less, especially from 1.5 mm or more to 2.5 mm or less.
8. The process according to one or more of items 1 to 7, characterized in that said adhesive is selected from the group consisting of reactive or non-reactive thermoplastic hot-melt adhesives, preferably a hot-melt adhesive based on ethylene vinyl acetates, polyacrylates, copolyamides, copolyesters, copolyethers, polyolefins, polyurethanes, or corresponding co- and/or terpolymers.
9. The process according to one or more of items 1 to 8, characterized in that said adhesive is a latent reactive two or more component system in which the reaction components are applied as a homogeneous mixture or as grid points adjacent to or over one another.
10. The process according to one or more of items 1 to 9, characterized in that said laminating sheet is a plastic sheet, preferably a plastic sheet based on polyvinyl chloride (PVC), polyolefins, thermoplastic polyolefins (TPO), polycarbonate, polyether, polyesters, polyurethanes, poly(meth)acrylate, or combinations, co- or terpolymers thereof.
11. The process according to one or more of items 1 to 10, characterized in that said laminating sheet has a thickness within a range of from 0.1 mm or more to 7.0 mm or less, preferably from 1.0 mm or more to 3.5 mm or less, more preferably from 1.5 mm or more to 2.5 mm or less.
12. The process according to one or more of items 1 to 11, characterized in that said component is made of an air-impermeable or partially air-permeable material.
13. The process according to one or more of items 1 to 12, characterized in that said component is dimensionally stable.
14. The process according to one or more of items 1 to 13, characterized in that said component is made of a material selected from the group consisting of injection-molded plastics of acrylonitrile-butadiene-styrene (ABS), polycarbonate ABS (PCABS), polypropylene (PP), polycarbonate (PC), thermoplastic polyolefin (TPO), fiber composites including natural fiber PP, glass fibers, carbon fibers, plastic fibers, mineral fillers, binder PP, polyurethane, phenolic resin, or combinations thereof.
15. The process according to one or more of items 1 to 14, characterized in that said component has no lamination grain.
16. The process according to one or more of items 1 to 15, characterized in that the laminating sheet coated with adhesive is heated before and/or during the bonding with the component.
17. The process according to one or more of items 1 to 16, characterized in that said laminated molded part is a vehicle interior trim component, or part of a vehicle interior trim component.
18. The process according to one or more of items 1 to 17, characterized in that the bonding of the laminating sheet with the component is conducted by extracting the air present between the component and the sheet through the channels by applying a reduced pressure in combination with pressing the air present between the component and the sheet out through the channels by applying a pressing force.

19. A laminated molded part, especially a vehicle interior trim component or part of a vehicle interior trim component, produced by a process according to one or more of the preceding items.

20. The use of a grid layout between a component and a laminate adhesive to reduce or prevent air pockets in the lamination of the component with the laminate sheet.

21. Usage in accordance with item 20, characterized in that the adhesive is applied in grid form on the surface of the laminate sheet and/or the component, which is formed by the application of the adhesive in a grid form on the surface of the channels, the component and the laminate sheet are bonded so that the layer of adhesive is applied in a grid form between the laminate sheet and the component, and the laminate sheet is bonded (laminated) with the component by removing (a) whereby, between the component and sheet, air is found in the channels by applying reduced pressure or by pressing (b) whereby, between the component and sheet, air is found in the channels by applying bonding pressure, or (c), a combination of (a) and (b).

22. The use of any one of items 20 or 21, characterized in that the adhesive is puncti-form or strip form applied to the laminate sheet, preferably in rectangular, polygonal, rhombic, round, or irregularly-shaped adhesive form, most preferably in a truncated pyramid or truncated conical adhesive form.

23. The use of one or more of items 20 to 22, characterized in that the laminate includes a vacuum laminate, an in-mold graining (IMG) method, a press laminate or hybrids thereof.

24. The use of the laminate mold in accordance with item 19 as a vehicle interior panel or as part of a vehicle interior panel.

According to the invention an adhesive grid provided between a component and a laminating sheet is used for reducing or avoiding air inclusions when the component is laminated with said laminating sheet.

The lamination may include vacuum lamination, an in-mold graining (IMG) method, or mixed forms of one of them with press lamination.

The laminated molded part which is made according to the method of the invention may be used as a vehicle interior trim component, or part of a vehicle interior trim component.

BRIEF DESCRIPTION OF THE FIGURES

FIG. 10a shows a schematic of a cross-section of a grain roller;

FIG. 10b shows a schematic perspective view of the grain roller of FIG. 10a;

DETAILED DESCRIPTION OF THE INVENTION

Figure 1:
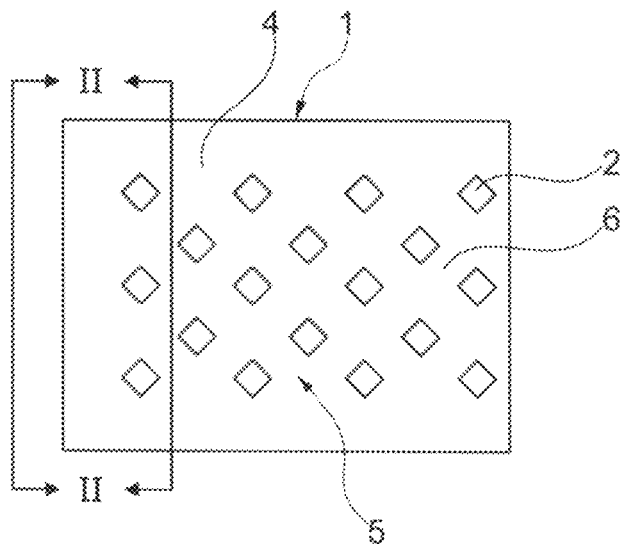
FIG. 1 shows schematically a plan view of a film having a pattern-applied hot melt adhesive.
Figure 2:
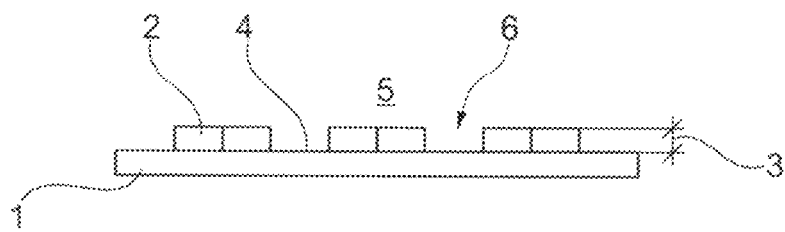
FIG. 2 shows a side view of FIG. 1 in accordance with local type II-II.

The present invention relates to the above-described process for preparing a laminated molded part from a component and a laminating sheet and a laminated molded part, especially a vehicle interior trim component, or part of a vehicle interior trim component, obtainable by the process according to the invention.

In addition, the present invention also relates to the use of an adhesive grid provided between a component and a laminating sheet for reducing or avoiding air inclusions upon lamination of the component with the laminating sheet.

The lamination preferably includes vacuum lamination, an in-mold graining (IMG) method, press lamination, or mixed forms thereof.

In the present disclosure, a "grid-like adhesive application" according to the present invention means a structured application of adhesive on a surface (i.e., the application of an adhesive in a certain pattern having a three-dimensional structure), said structured application having channels or a channel system between the individual adhesive deposits, this system being preferably contiguous. The adhesive is preferably applied in the form of dots and/or stripes at predetermined intervals (i.e., in a particular grid). The channels (or channel system) formed thereby between the adhesive deposits enable optimum extraction, i.e., removal, of the air present between the sheet and component after the laminating sheet and the component have been joined together. The extraction of the air is typically effected through the periphery of the component, and/or by applying a reduced pressure/vacuum through vacuum holes provided in the component. In particular, the continuous channels (channel system) enable a uniform removal of the air by vacuum removal over the entire surface of the component covered with the sheet, whereby this occurs substantially independently of the geometry of the component (for example, for any given radii or peripheral edges). In sheet lamination with the additional application of pressure, i.e., the extraction of air present between the component and the sheet through the channels by applying a reduced pressure in combination with pressing the air present between the component and the sheet out through the channels by applying a pressing force, the grid-like application of adhesive which gives rise to the channel system is also advantageous because the air that is present between the component and the sheet can be removed uniformly over the entire surface of the component.

Further, it has surprisingly been found that the grid-like channel-forming structure of the adhesive application is sufficiently maintained during the laminating process, and that no flowing of the adhesive occurs. The type of adhesive employed is not limited, and thus all laminating adhesives used in sheet laminating can, in principle, be employed. In this respect, reference is made to the relevant known prior art.

Further, the grid-like adhesive application enables sufficient contact to the surrounding air and thus to atmospheric humidity through the channels when moisture-reactive adhesives are used. This avoids incomplete cross-linking of the adhesive and thus the formation of flaws with no adhesion.

The grid-like application of adhesives, especially of hot-melt adhesives, is per se known to one of skill in the art. However, the grid-like application is typically employed only for reasons of reducing the adhesive quantity, better anchoring of the adhesive in open substrates such as foams, and producing breathable laminates in, for example, the lamination of breathable membranes in which a closed adhesive film is undesirable. However, it's purposeful use in a laminating process using reduced pressure or the simultaneous application of reduced pressure and pressing force, in particular for reducing and avoiding air inclusions, is not known.

When a particular patterning method in which the adhesive is applied in a grid-like manner is purposefully used, regions, especially linear regions, free of (or with a clearly lower amount of) applied adhesive (so-called channels) are formed. These channels are maintained sufficiently long during the lamination process, such that a complete and extensive, i.e., uniform, removal of the air present between the sheet and the substrate via the application of suction (reduced pressure) or the simultaneous application of suction and pressing out of the air becomes possible. Preferably, the channels are maintained until the end of the lamination process and, in particular, are maintained in the ready-laminated molded part.

In principle, the geometry of the pattern or of the grid is not limited as long as it is ensured that sufficient channels are formed to enable the removal of air by suction or suction and pressing out, and to ensure sufficient access of air (and thus access of moisture to the adhesive) for moisture-reactive adhesives.

Preferably, the adhesive is applied in dots or stripes, more preferably in the form of truncated-pyramid-shaped, polygonal (for example, triangular, tetragonal, pentagonal, hexagonal, heptagonal, octagonal, nonagonal or decagonal), diamond-shaped, rectangular, oval, L-shaped, round or irregularly shaped adhesive deposits, especially in the form of truncated-pyramid-shaped adhesive deposits.

Further, patterns that are sufficiently known to one of skill in the art from the standard grain patterns of the components may also be employed.

The adhesive deposits (especially the truncated-pyramid-shaped adhesive deposits) are preferably applied at intervals (measured on the substrate surface) of from 0.1 mm or more to 10.0 mm or less, preferably from 0.3 mm or more to 5.0 mm or less, more preferably from 0.5 mm or more to 4.0 mm or less, even more preferably from 1.0 mm or more to 3.5 mm or less, especially from 1.5 mm or more to 2.5 mm or less.

The depth of the pattern, i.e., the thickness (height as measured from the respective substrate surface) of the adhesive deposits, is preferably within a range of from 0.1 mm or more and 1.5 mm or less, more preferably from 0.2 mm or more and 1.0 mm or less, even more preferably from 0.5 mm or more and 0.8 mm or less.

The adhesive deposits are preferably applied in an irregular arrangement or in distinct areas of differing, preferably irregular, arrangements, i.e., without forming extended linear channels. The formation of a secondary structure (i.e., a structure that becomes recognizable only by a particular regular arrangement of the adhesive deposits) is thus avoided, which has the effect that the viewer of the finished laminated component obtains the impression of a particularly smooth surface. Of course, regular adhesive deposits in the shape of geometric patterns, combinations thereof, or combinations thereof with irregular adhesive deposits are also possible. Also, the pattern of the adhesive can be adapted to the molded part, the shape of the molded part and/or the surface of the molded part.

In particular, due to the channels designed/formed by the adhesive grid, components possessing no grain (or those having a flat, typically unsuitable grain, or a smooth surface) and components having only a few (vacuum-) holes can also be laminated. Thus, a significantly lower number of flaws arise. In the preferred ideal case, the final product has no recognizable flaws.

If the adhesive is molten (e.g., when hot-melt adhesives are used), it does not flow over the entire surface. However, if a suitable pattern exists, individual droplets are formed, and the channels between the droplets are maintained. Such channels then enable a continuous transport of air in the region between the component and the laminating sheet and, in turn, the desired horizontal vacuum mobility (horizontal transport of air, i.e., removal of the air) within the adhesive grid.

Figure 12:
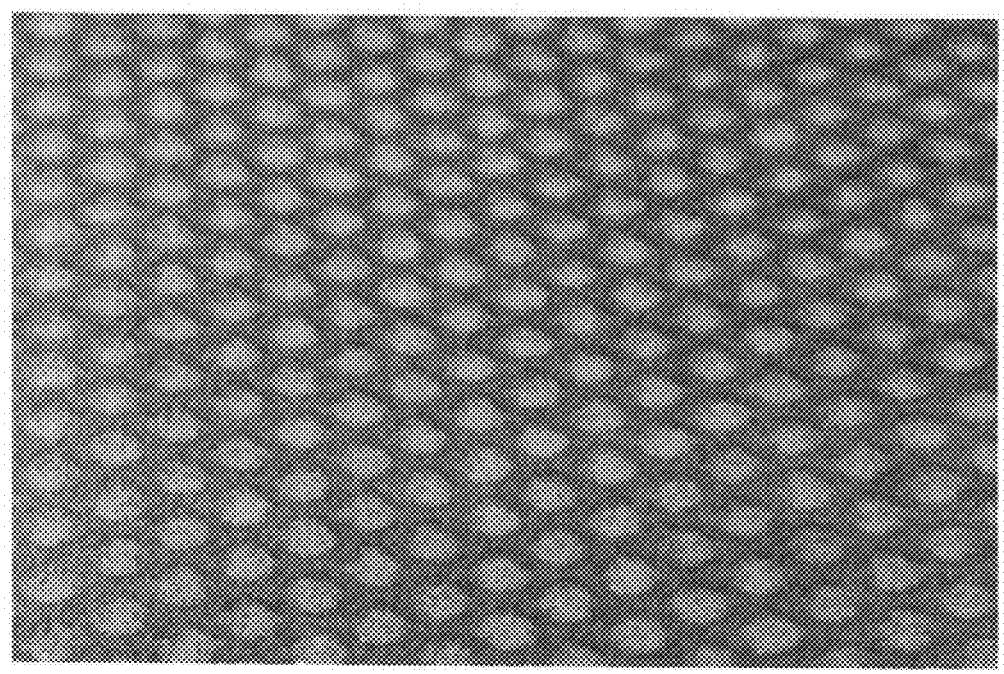
FIG. 12 shows a picture of the drop structure of the adhesive application that is still present after heating and cooling.

FIG. 12 shows the drop structure of the adhesive deposit between the sheet and the component that is still present after heating and cooling.

In one embodiment, the adhesive is selected from the group consisting of reactive or non-reactive thermoplastic hot-melt adhesives. In another embodiment the adhesive is selected from the group consisting of hot-melt adhesives based on ethylene vinyl acetates, polyacrylates, copolyamides, copolyesters, copolyethers, polyolefins, polyurethanes, and corresponding copolymers and/or terpolymers.

In one embodiment, the process of the present invention is generally performed in a way wherein the joining of the laminating sheet and component is performed by applying a reduced pressure (or vacuum) or by means of the simultaneous application of a reduced pressure and a pressing force after the application of adhesive to the laminating sheet and/or component. The bonding by means of pressure (i.e., the application of a pressing force) is affected, for example, by pressing the sheet onto the component or pressing the component into the sheet whereby the sheet is placed in a rigid or elastic support whose shape is adapted to that of the component.

The application of adhesive is preferably applied on a surface of the laminating sheet that will be facing the substrate to be laminated in the subsequent step. The laminating sheet coated with adhesive in a grid-like manner can be immediately placed onto the component and subsequently laminated or, alternatively, it may be stored and used later for lamination. In the latter case, the sheet pre-coated with adhesive is preferably stable when stored. This also means that, when in the form of rolled goods, it will not block during storage and transport, and that the properties of the pattern are maintained during storage and transport.

The bonding by means of vacuum is usually affected by applying a vacuum through the periphery of the component or through openings provided in the component, through which a reduced pressure can be applied (so-called vacuum holes). The number of vacuum holes is to be adapted to the size and geometry of the respective component and to the pattern of adhesive/application of adhesive employed. Preferably, at least one vacuum hole is provided in the component. In further embodiments according to the invention, two, three, four or even more openings are provided in the component (substrate or base part).

Preferably, the bonding of the laminating sheet and component is affected with heating, especially above the melting or softening range of the adhesive.

In one embodiment, a suitable hot-melt adhesive is first applied to the laminating sheet in a grid-like manner, and the sheet is subsequently joined with the component to be laminated. The hot-melt adhesive is usually heated above its melting or softening temperature before and/or during the joining of the laminating sheet and component, such to ensure a reliable adhesive bond between the laminating sheet and the component.

In order to ensure both a reliable bond between the laminating sheet and the component and, at the same time, good processing properties such as optical properties etc., the adhesive is preferably employed or applied in an amount of from 10 g/m² or more to 200 g/m² or less, preferably from 50 g/m² or more to 100 g/m² or less.

After application, the adhesive preferably covers from 40% or more to 99% or less of the entire surface of the sheet and/or component provided with the adhesive grid, preferably of the sheet, more preferably from 60% or more to 90% or less, even more preferably from 70% or more to 85% or less.

The application of the adhesive can be effected with heating, usually with melting, at temperatures within a range of from 40° C. or more and 220° C. or less, especially from 120° C. or more and 190° C. or less.

In one embodiment, this is affected through heating of the laminating sheet (the sheet being coated with the adhesive) before and/or during the bonding with the component. Alternatively, the component may also be heated.

In one embodiment, a solvent-free hot-melt adhesive is employed as the adhesive. In particular, these are adhesives which are solid at room temperature (21° C.+/−1° C.), anhydrous and solvent-free, which are applied in the molten state to the materials to be bonded and, after the joining, will set physically and/or chemically with solidification while cooling.

However, also suitable are pressure-sensitive adhesives, dispersion adhesives, solvent adhesives, for example, based on polyurethane, polyacrylate, ethylene/vinyl acetate (EVA), poly(vinyl acetate) (PVAC), styrene-isoprene-styrene copolymer (SIS), styrene-butadiene-styrene copolymer (SBS), or chloroprene rubber (CR).

Depending on the demands, suitable hot-melt adhesives may be, in particular, hot-melt adhesives being thermoplastic or reactive in nature.

The hot-melt adhesives employed are selected, in particular, subject to the materials to be bonded and the respective relevant requirements such as, for example, a required temperature or heat resistance of the bond, etc.

As thermoplastic hot-melt adhesives, those based on ethylene/vinyl acetates (EVA), polyolefins (e.g., amorphous poly-alpha-olefins or polyolefins produced by metallocene catalysis), polyacrylates, copolyamides, copolyesters, and/or thermoplastic polyurethanes, or corresponding co- and/or terpolymers may, in particular, be employed. In one embodiment, the polyolefins are produced by metallocene catalysis, as they have an increased lack of tack.

As reactive and, for example, moisture-curing, hot-melt adhesives, those based on silane-grafted amorphous poly-alpha-olefins, silane-grafted polyolefins produced by metallocene catalysis (cf. EP 1 508 579 AI), or isocyanate-terminated polyurethanes are employed in one embodiment of the present invention. With reactive hot-melt adhesives, the subsequent cross-linking with moisture leads to temperature- and heat-resistant bonds. Thus, reactive hot-melt adhesives combine the advantages of an early initial strength from the physical setting process of cooling with a subsequently-occurring chemical cross-linking. When moisture-reactive hot-melt adhesives are processed, the melt must be protected from moisture before being applied.

Suitable polymers for reactive moisture-curing hot-melt adhesives according to the present invention include, for example, the silane-modified poly-alpha-olefins commercially available from Degussa AG, Marl, Germany, under the product designation "Vestoplast® 206". Particularly preferred according to the invention are silane-modified poly-alpha-olefins with number average molecular weights, Mn, of from 5,000 to 25,000 g/mol, preferably from 10,000 to 20,000 g/mol.

As described in some detail hereinafter, additives based on non-reactive polymers, resins and/or waxes such as, for example, optionally hydrogenated rosin esters and aliphatic hydrocarbon resins may be added to the reactive hot-melt adhesives for controlling the open time and/or the adhesive properties.

The application of the adhesive to the surface of the sheet and/or component, is effected, as described above, in temperature ranges of from 90° C. or more to 220° C. or less, or from 120° C. or more to 190° C. or less.

In order to achieve a good applicability of the hot-melt adhesive, hot-melt adhesives are usually employed that have Brookfield viscosities within a range of generally from 50 to 1,000,000 mPa·s at the processing temperatures. In one embodiment, the Brookfield viscosities are from 90° C. to 200° C.

For example, reactive hot-melt adhesives based on silane-grafted polyolefins, especially silane-grafted poly-alpha-olefins, may be employed, that have Brookfield viscosities at 180° C. within a range of from 50 to 50,000 mPa·s, from 1,000 to 10,000 mPa·s, from 5,000 to 8,000 mPa·s, or from 5,500 to 7,500 mPa·s.

For controlling the reactivity and the cross-linking behavior, catalysts suitable for such purposes such as, for example, dibutyltin dilaurate (DBTL) may usually be added to the reactive hot-melt adhesives in amounts common for such purposes. Examples of suitable catalysts include the commonly-known catalysts in adhesives chemistry such as organic tin compounds, e.g., dibutyltin dilaurate (DBTL) as mentioned above, or alkyl mercaptide compounds of dibutyltin, or organic iron, lead, cobalt, bismuth, antimony and zinc compounds, as well as mixtures of the above-mentioned compounds, or amine-based catalysts such as tertiary amines, 1,4-diazabicyclo[2.2.2]octane and dimorpholino diethyl ether, and mixtures thereof. In one embodiment, the catalyst is dibutyltin dilaurate (DBTL), especially in combination with adhesives based on the above-mentioned reactive, preferably silane-modified, poly-alpha-olefins. The amounts of catalyst(s) employed may vary greatly; in one embodiment, the amount of catalyst employed is from 0.01 to 5% by weight, based on the weight amount of adhesive. For controlling the application properties of the adhesives, further additives may be added, such as plasticizers, high boiling organic oils or esters or other additives serving for plasticization, stabilizers, antioxidants, acid scavengers, fillers, anti-ageing agents, and the like.

For controlling the open time and/or the adhesive properties of the above-mentioned adhesives, especially also with respect to improved handling properties, further additives based on non-reactive polymers, resins and/or waxes may be additionally added to the above-mentioned hot-melt adhesives. In this way, the adhesive properties can be adjusted or tailored according to application.

The non-reactive polymers may be selected from the group consisting of (i) ethylene/vinyl acetate copolymers or terpolymers, especially those having vinyl acetate contents of from 12 to 40% by weight, especially from 18 to 28% by weight, and/or with melt flow indices (MFIs, DIN 53735) of from 8 to 800, or from 150 to 500; (ii) polyolefins such as unmodified amorphous poly-alpha-olefins, especially with number average molecular weights, Mn, of from 5,000 to 25,000 g/mol, or from 10,000 to 20,000 g/mol, and/or with ring-and-ball softening ranges of from 80° C. to 170° C., or from 80° C. to 130° C., or unmodified polyolefins produced by metallocene catalysis (cf. DE 103 23 617 A1); and (iii) (meth)acrylates, such as styrene (meth)acrylates, as well as mixtures of such compounds.

The non-reactive resins may be selected from the group consisting of hydrocarbon resins, such as aliphatic, cyclic or cycloaliphatic hydrocarbon resins, optionally modified rosins (e.g., rosin esters), terpene phenol resins, coumarone-indene resins, methylstyrene resins, polymerized liquid resin esters, and/or ketone aldehyde resins.

As the non-reactive waxes, polyolefin waxes such as, for example, polyethylene and polypropylene waxes, or waxes modified on this basis may be employed.

In one embodiment of the present invention, the components are interior trim components of vehicles. Such components are made of materials based on natural-fiber-reinforced polymer materials such as a natural fiber, such as flax, polypropylene material, a natural fiber, such as flax, PUR, or a natural fiber, such as flax, epoxy resin material, as well as a support produced by an injection molding process and made of polypropylene (PP), acrylonitrile-butadiene-styrene copolymer (ABS), styrene-isoprene-styrene copolymer (SIS), polycarbonate ABS (PCABS), polycarbonate (PC), thermoplastic polyurethane (TPU), thermoplastic polyolefin (TPO), or polyamide.

In one embodiment, the materials used for the plastic injection molding are acrylonitrile-butadiene-styrene copolymer (ABS), polycarbonate ABS (PCABS), polypropylene (PP), polycarbonate (PC), thermoplastic polyolefin (TPO), fiber composites including natural fiber PP, glass fibers, carbon fibers, plastic fibers, mineral fillers, binder PP, polyurethane, phenolic resin, or combinations thereof.

The components may be grained. However, components without a grain or with a grain unsuitable for the removal of air (which is the case, for example, when the grain is too flat) are preferred.

Further, the components are preferably dimensionally stable and/or air-impermeable, or only partially air-permeable, or vacuum-permeable.

The laminating sheet may be a plastic sheet, preferably a plastic sheet based on polyvinyl chloride (PVC), polyolefins, thermoplastic polyolefins (TPO), polycarbonate, polyether, polyesters, polyurethanes, poly(meth)acrylate, or combinations thereof. However, also suitable are other (decorative) materials such as foam laminates, textiles, metal foils, genuine leather, artificial leather, and layer composites made from a variety of the above-mentioned materials. Air impermeability can be achieved by using additional membranes.

The laminating sheet preferably has a thickness within a range of from 0.1 mm or more and 7.0 mm or less, preferably from 1.0 mm or more and 3.5 mm or less, more preferably from 1.5 mm or more and 2.5 mm or less.

The plastic sheets include, sheets based on polyolefins such as polyethylene and polypropylene. Further, sheets based on polyester, polyamide, polycarbonate, polyvinyl chloride, poly(methyl methacrylate) and polystyrene can be used. "Polyolefins", such as polyethylene and polypropylene, as used herein not only means the corresponding ethylene and propylene homopolymers, but also copolymers with other olefins, such as acrylic acid or 1-olefins. Thus, "polyethylene" as used herein means, ethylene copolymers with from 0.1 to less than 50% by weight of one or more 1-olefins such as propylene, 1-butene, 1-pentene, 1-hexene, 1-octene, 1-decene, or 1-dodecene, with propylene, 1-butene and 1-hexene can be used. "Polypropylene" may also mean, propylene copolymers with from 0.1 to less than 50% by weight of ethylene and/or one or more 1-olefins, such as 1-butene, 1-pentene, 1-hexene, 1-octene, 1-decene, or 1-dodecene, with ethylene, 1-butene and 1-hexene. In one or more embodiments, "polypropylene" means isotactic polypropylene.

Sheets of polyethylene can be prepared from HDPE or LDPE or LLDPE.

Among sheets of polyamide, those derived from nylon 6 are preferred.

Among sheets of polyester, those made of polybutylene terephthalate and especially polyethylene terephthalate (PET) are preferred.

Among sheets of polycarbonates, those derived from polycarbonates prepared using bisphenol A are preferred.

"Sheets of polyvinyl chloride" means sheets of rigid polyvinyl chloride or soft polyvinyl chloride, wherein soft polyvinyl chloride includes copolymers of vinyl chloride with vinyl acetate and/or acrylates.

"Plastic sheets" within the meaning of the present invention may include composite sheets such as, for example, sheets comprising one of the sheets mentioned above, and a metal foil or fiber sheets.

Within the scope of the present invention, various laminating tests were performed on smooth ungrained components with a TPO foam sheet as usually employed in the automobile field, wherein different component geometries, adhesive patterns (on the TPO sheet), laminating parameters and different numbers and types of bores as well as bore positions in the component were tested. The component material and the adhesive were selected so that the adhesive builds up only limited adhesion to the components, thus enabling peeling of the laminated sheet and an exact inspection of the bonding joint. The analysis of the components laminated according to the invention showed a perfect bonding without air inclusions.

In fact, the channels formed by the pattern application are still recognizable in the laminated molded part. This avoids, for example, the incomplete or slowed cross-linking of the adhesive in regions lacking air contact (which is feared with moisture-curing reactive adhesives).

Figure 13:
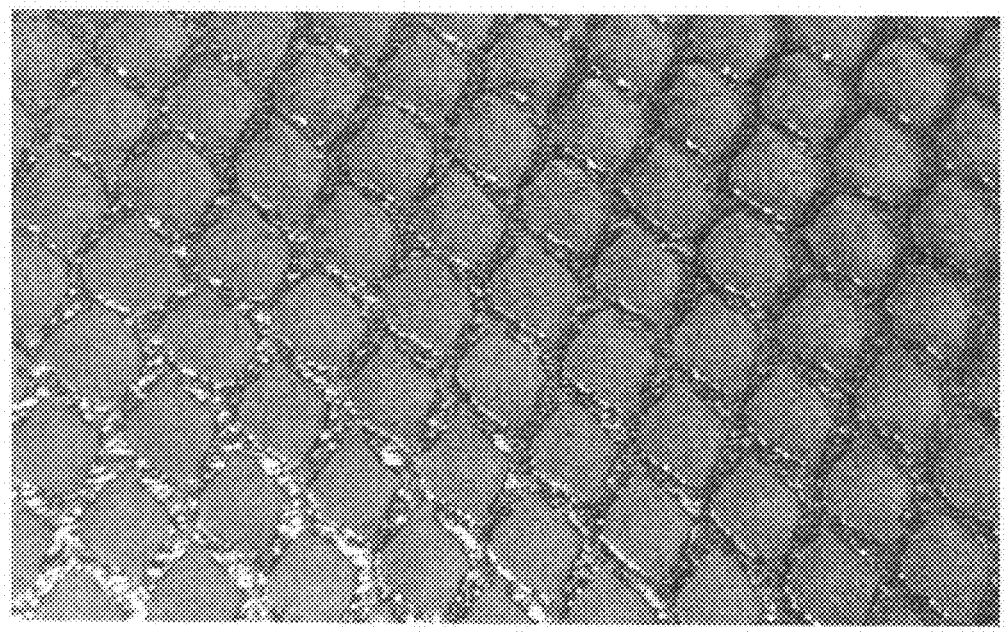
FIG. 13 shows a picture of an example of the adhesive structure after detaching the sheet from the component.

FIG. 13 shows an example of an adhesive structure after detaching the sheet from the component. The brightly shining channels, which enabled a uniform removal of the air present between the component and the sheet, are completely maintained.

By means of components with selected geometries and hole positions, it has been shown that sufficient air transport within the adhesive grid is ensured over distances of more than 10 cm from the next hole, as well as over critical regions such as edges and radii.

Further, it has been found that a substantially lower number of vacuum holes is necessary as compared to those required in the prior art. Elongated hole shapes (e.g., slots) whose length exceeds that of the pattern grid have proven particularly useful. Thus, it is ensured that a hole cannot be clogged by a single adhesion deposit, and that there is always contact between the hole and the channel system in the adhesive grid.

Comparative experiments with a classical smooth (i.e., not grid-like) roller application of the same amount of adhesive have not shown any horizontal air transport on ungrained surfaces. Only in regions where the sheet is practically "rolled out" onto the component because of the component geometry and the dynamics of the laminating process, can no air inclusions be seen. In particular, all surfaces show a lack of wetting and bonding caused by air inclusions over about 20 to 80% of the surface, even in the presence of a number of holes. Also comparative experiments without adhesive show practically no horizontal air transport. The soft sheet seals immediately to the smooth substrate.

The laminate sheet 1 in FIG. 1 is made up of a substantially two-dimensional art material sheet, which is meant to dress an interior panel part on the body of a motor vehicle and to be laminated on a support part with the B-side in FIG. 1 visible.

In preparing the compound, a hot melt is applied to laminate sheet 1, and in a variety of rhombuses 2 (labeled). Each rhombus 2 has a height of 3, with which it rises above a surface 4 on the B-side 5 of the laminate sheet 1. In between the rhombus 2, a system of channels is generated that are fully linked with each other.

Figure 3:
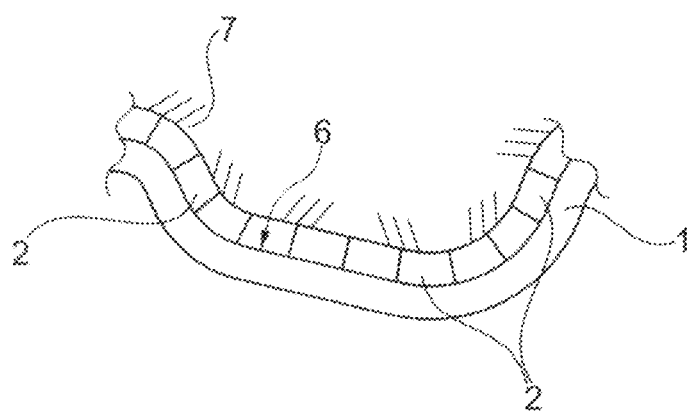
FIG. 3 shows an analog section of FIG. 2, but on a support part in a tool.

Laminate sheet 1 is now laminated in a mold on support part 7 (see FIG. 3), thus keeping height 3 of rhombuses 2 upright from the hot melt of the open linked feature of channel system 6. The air in the tool can be removed laterally. It flows through the free cross-section of the channel system 6. Here, laminate sheet 1 moves even closer step by step to support part 7 until a direct positive fit lock finally occurs when the air is sucked out of channel system 6.

Figure 4:
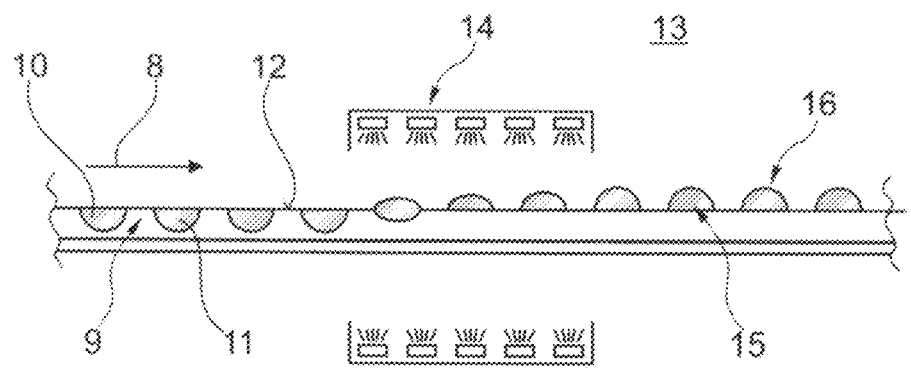
FIG. 4 shows a schematic of a longitudinal section using a laminate sheet in a station for leveling indentations in the laminate sheet.

A previously described embodiment of the invention provides for the event that indentations are incorporated in the laminate sheet, whereby adhesive is placed into the indentations, and then in a further step, the indentations of the laminate sheet are flattened, so that the adhesive reaches the surface of the laminate sheet. An example of this is shown in FIG. 4. A laminate sheet 9 tapering in machine direction 8 has embossed macroscopic channels 10 (exemplarily characterized) that are filled with an adhesive 11 (exemplarily labeled). Every channel 10 receives a drop of adhesive 11.

On a surface 12 towards a B-side 13, the adhesive 11 is made to be flat and flush with the surface 12 between the channels 10. The laminate sheet 9 is guided in machine direction 8 through a station with two radiant heaters 14 (exemplarily labeled), which leads to the heating of laminate sheet 9.

A memory effect in the plastic of the laminate sheet 9 results in the channels 10 receding in the areas of the radiant heaters 10 and 14 and becoming flat with surface 12 of laminate sheet 9. Here, it contrasts in the memory effect, restoring the synthetic material of the laminate sheet 9 to the adhesive 11, so that the adhesive ultimately projects from the channels 10 in droplets 15 from the sheet surface and forms an open, linked channel system 16 (exemplarily labeled) between the droplets 15.

In other forms, the sheet is heated prior to thermoforming. By heating it, the sheet can be stamped and the channels can be refilled with adhesive. The sheet becomes smooth again. The adhesive, which was in the channels, is applied to the inflated structure on the sheet.

Figure 5:
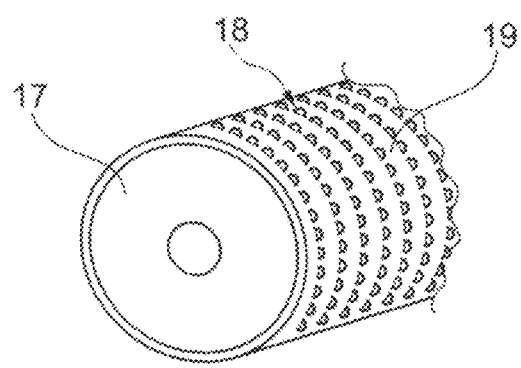
FIG. 5 shows a schematic of a perspective view of an embossing roller implementation of an embodiment of the present invention.
Figure 6:
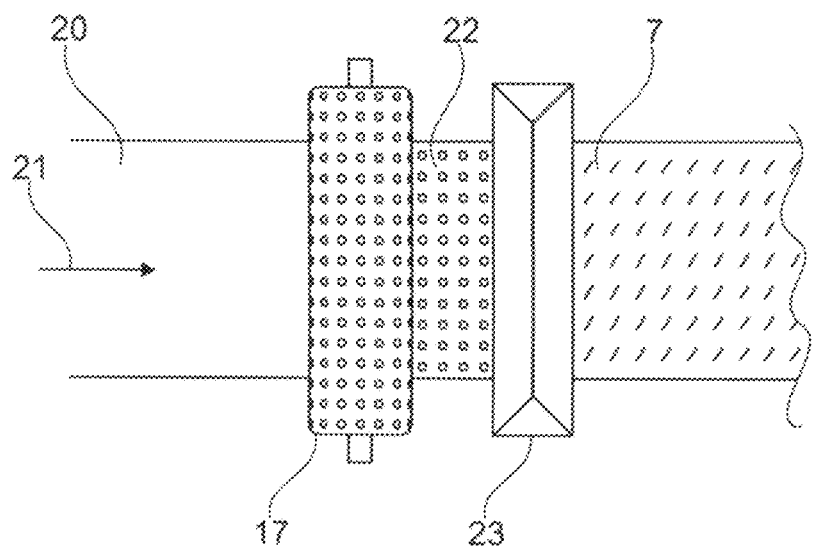
FIG. 6 shows a schematic of a plan view of a rolling mill using the roller as shown in FIG. 5.

Embossing roll 17 in FIGS. 5 and 6 essentially consists of a conventional deflection roller, whereby on a lateral surface 18, a variety of macroscopically structured bumps 19 is arranged (exemplarily labeled). For example, each elevation 19 forms a partially spherical body.

Figure 7:
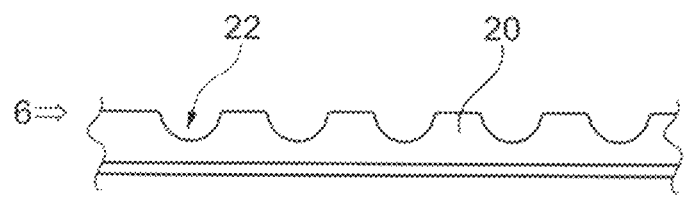
FIG. 7 shows a schematic of a longitudinal sectional view of a sheet with embossed channels.
Figure 8:
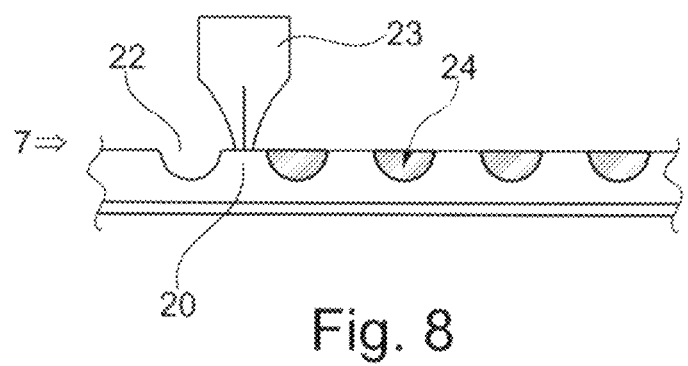
FIG. 8 shows an analog schematic of a sectional view of FIG. 6, showing the channels filed with adhesive.

Run a laminate sheet 20 through the system in a machine direction 21, so that it passes around to the embossing roller 17 and where it holds a number of grooves 22 (exemplarily labeled) (cf. also FIGS. 7 and 8).

Subsequently, the laminate sheet 20 is provided with grooves 22 from a slot die 23 with minimal spacing running along it. The hot glue comes from the slot die 23 throughout the process. As a result, the surface of the laminate sheet 20 immediately strips along between grooves 22, and ideally does not contact them. Adhesive 24 only or at least mainly, pass into the grooves 22.

Figure 9:
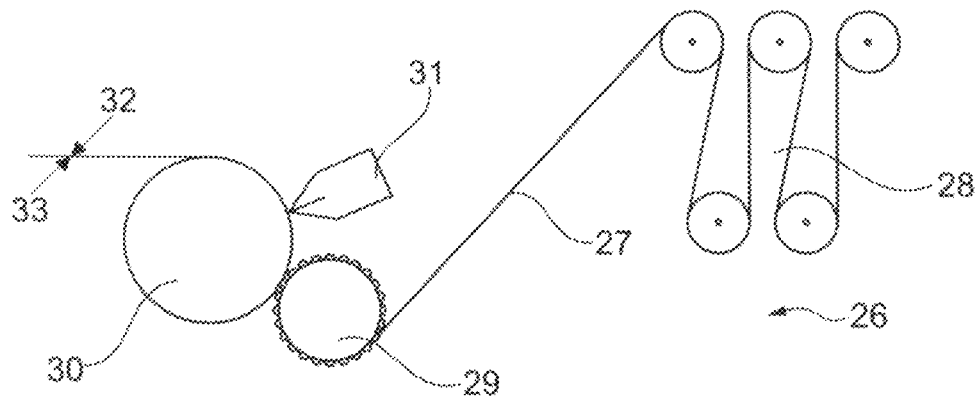
FIG. 9 shows a schematic of a lateral view of a rolling mill.

A possible roller route 25 for a system to laminate from support parts with laminate sheets is shown in FIG. 9. The laminate sheet 27 runs in a machine direction 26, firstly into sheet storage 28 with floating rollers. After the sheet storage 28, the laminate sheet 27 runs along and to a tempered embossing roll 29 of about 180° C. The embossing roller 29 runs the laminate sheet 27 in the machine direction directly to a pressure roller 30, which has a slot die 31 on the film circulation side for applying adhesive (not shown). Therefore, a B-side 32 can be filled with grooves and adhesive, whereas an A-side 33 can remain intact.

Figures 10A, 10B:
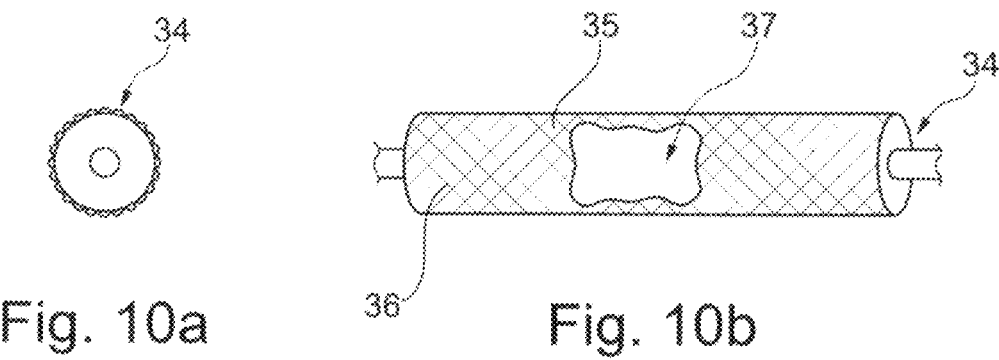
Figure 11:
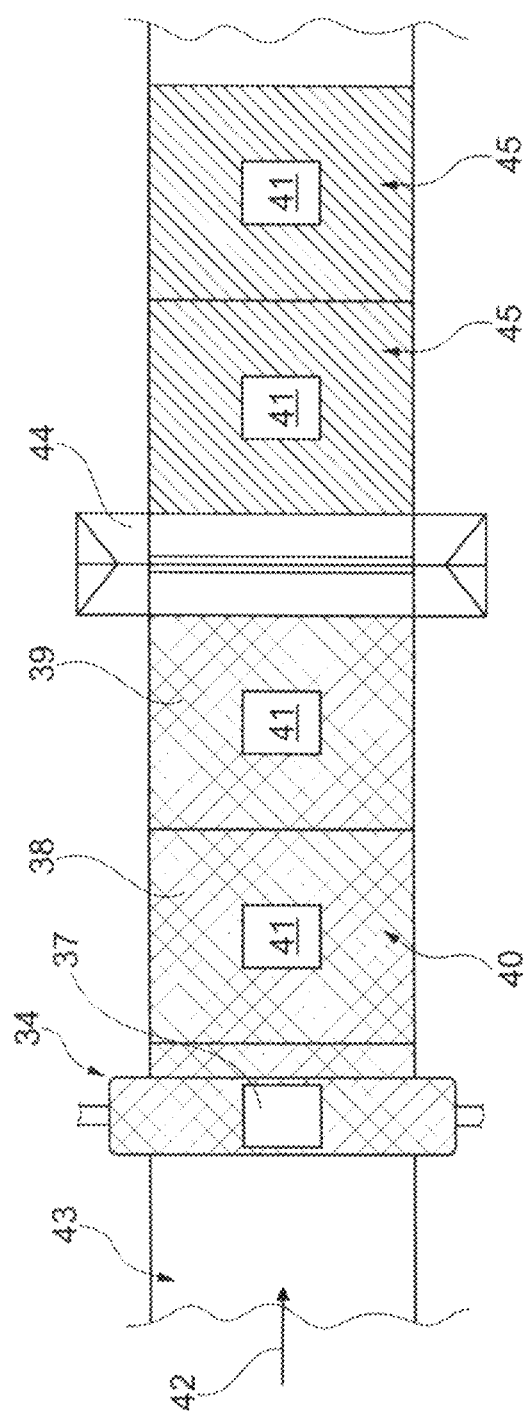
FIG. 11 shows a schematic illustration of a plan view of a system using the grain roller as shown in FIG. 10a and FIG. 10b.

The embodiment of the grain roller 34 in FIGS. 10a, 10b and 11 bears a predominant area of grain structure 36 on its cover 35, which is preferably a replica of natural leather.

However, a range of several cm² sizes have a slot, which is not grained. During production, this type of grain roller 34 can thus produce individual copies (labeled), each having a large grained area 40, but also a non-grained area 41 further in a machine direction 42, passing through the laminate sheet 43, then a station with a slot die 44 in which an adhesive application is carried out.

With this embodiment, the adhesive roller areas can be left out. For example, application areas are found in the reduction of waste adhesive. In some door panels, partial sheet areas are stamped after lamination. If there is no glue in these areas, then the blank stamp can also be easily removed.

In one or more embodiments, it may be advantageous to only provide adhesive to the raised areas of an embossed laminate sheet, i.e. the non-recessed areas. The recessed plates are then capable of going back up, however this is not required, and the channels form in any case.

The embossing roller can include, for example, a channel pattern. Alternatively, it may be conceivable to draw a blade over the grid; thereby the adhesive is applied in the required macroscopic structured form.

LIST OF REFERENCES USED

1 Laminating film
2 Rhombus

3 Height
4 Surface
5 B-side
6 Duct system
7 Support part
8 Machine direction
9 Protective film
10 Groove
11 Adhesive
12 Surface
13 B-side
14 Radiant heat
15 Droplet
16 Duct system
17 Embossing roller
18 Cover surface
19 Collection
20 Protective film
21 Machine direction
22 Groove
23 Slot die
24 Adhesive
25 Roller route
26 Machine direction
27 Protective film
28 Film storage
29 Embossing roller
30 Pressure roller
31 Spot die
32 B-side
33 A-side
34 Grain roller
35 Cover
36 Grain structure
37 Recess
38 Single use
39 Single use
40 Grained areas
41 Non-grained area
42 Machine direction
43 Protective film
44 Spot die
45 First area

EXAMPLES

All determinations and measurements of parameters were performed, unless stated otherwise, under the standard conditions familiar to the skilled person, i.e., at room temperature (21° C.+/−1° C.) and under atmospheric pressure (1 atm).

In the following experiments, a non-reactive polyolefin-based hot-melt adhesive from Jowat AG, Germany (Jowat Toptherm® 238.30) was used.

The adhesive was applied to the bottom side of a TPO sheet (BeneckeKaliko/Germany, 2 mm foam with 0.8 mm cover layer) by means of a gravure roller from the company Hardo (Germany) by roller application.

A dish-like component (240 mm diameter, 50 mm depth) of polyoxymethylene (POM) without grain with vacuum holes at intervals of about 2 cm in the outer periphery was laminated with the coated sheet on a single position vacuum laminating system from the company Kiefel (Germany), wherein the bottom side of the sheet was heated at 180° C., the top side was heated at 140° C., and the sheet was drawn by 5% in the longitudinal and transversal directions. Subsequently, the laminated component was examined for flaws caused by air inclusions and for the size of the laminated area (to estimate the range of the transport of air through the channels of the pattern).

The results are shown in the following Table:

TABLE

| No. | Adhesive application mass per unit area | Pattern grid spacing | Pattern depth | Number of vacuum holes | Result of lamination |
|---|---|---|---|---|---|
| 1 | 70 g/m$^2$ | 2.5 mm | 0.64 mm | 35 holes (diameter 0.5 mm) | very good: no flaws, very large lamination area |
| 2 | 40 g/m$^2$ | 1.0 mm | 0.55 mm | 35 holes (diameter 0.5 mm) | good: no flaws, large lamination area |
| 3 | 70 g/m$^2$ | smooth | smooth | 35 holes (diameter 0.5 mm) | insufficient: many flaws, very small lamination area |
| 4 | 40 g/m$^2$ | smooth | smooth | 35 holes (diameter 0.5 mm) | insufficient: many flaws, very small lamination area |
| 5 | 70 g/m$^2$ | 2.5 mm | 0.64 mm | 4 holes (diameter 0.5 mm) | satisfactory: no flaws, medium-sized lamination area |
| 6 | 70 g/m$^2$ | 2.5 mm | 0.64 mm | 4 long holes (0.5 mm × 5 mm) | very good: no flaws, large lamination area |
| 7 | 70 g/m$^2$ | 2.5 mm | 0.64 mm | without holes | insufficient: lamination not possible, access to vacuum insufficient |

The invention claimed is:

1. A process for preparing a laminated molded part from a component and a laminating sheet, comprising:
applying a hot-melt adhesive at a temperature within a range of 40° C. to 220° C. in a grid-like manner to the surface of at least one of the laminating sheet and of the component, wherein channels are formed on the surface from the grid-like application of the adhesive, and wherein the adhesive covers, upon application, from 40% to 99% of the entire surface of the laminating sheet or the component, whichever is provided with the adhesive grid;
joining the component and the laminating sheet in such a way that the layer of the adhesive applied in a grid-like manner is arranged between the laminating sheet and the component; and
bonding the laminating sheet with the component by extracting air present between the component and the laminating sheet through the channels by applying a reduced pressure between the component and the laminating sheet.

2. The process according to claim 1, wherein the step of applying the adhesive includes applying the adhesive as dots or stripes, in a form selected from truncated-pyramid-shaped, polygonal, diamond-shaped, rectangular, oval, L-shaped, round and irregularly shaped adhesive deposits.

3. The process according to claim 2, wherein that said adhesive deposits are provided at intervals of from about 0.1 mm to about 10.0 mm.

4. The process according to claim 1, wherein said hot-melt adhesive is selected from the group consisting of reactive and non-reactive thermoplastic hot-melt adhesives, and hot-melt adhesives based on polyacrylates, copolyamides, copolyesters, copolyethers, polyolefins, polyurethanes, or corresponding copolymers and terpolymers.

5. The process according to claim 1, wherein said laminating sheet is a plastic sheet produced from a composition selected from polyvinyl chloride (PVC), polyolefins, thermoplastic polyolefins (TPO), polycarbonate, polyether, polyesters, polyurethanes, poly(meth)acrylate, copolymers and terpolymers thereof and combinations thereof.

6. The process according to claim 1, wherein said laminating sheet has a thickness within a range of from about 0.1 mm to about 7.0 mm.

7. The process according to claim 1, wherein said component is made of an air-impermeable or partially air-permeable material.

8. The process according to claim 1, wherein said component is made of a material selected from injection-molded plastics of acrylonitrile-butadiene-styrene (ABS), polycarbonate ABS (PCABS), polypropylene (PP), polycarbonate (PC), thermoplastic polyolefin (TPO), fiber composites, natural fiber PP, glass fibers, carbon fibers, plastic fibers, mineral fillers, binder PP, polyurethane, phenolic resin, and combinations thereof.

9. The process according to claim 1, wherein said component has no lamination grain.

10. The process according to claim 1, further comprising heating the laminating sheet coated with adhesive before bonding or during bonding with the component.

11. The process according to claim 10, wherein the step of bonding includes applying a reduced pressure in combination with the pressing of air present between the component and the laminating sheet out through the channels by applying a pressing force.

12. The process according to claim 10, wherein the step of applying the adhesive includes applying the adhesive as dots or stripes in a form selected from truncated-pyramid-shaped, polygonal, diamond-shaped, rectangular, oval, L-shaped, round and irregularly-shaped adhesive deposits.

13. The process according to claim 11, wherein the step of applying the adhesive includes applying the adhesive as dots or stripes in a form selected from truncated-pyramid-shaped, polygonal, diamond-shaped, rectangular, oval, L-shaped, round and irregularly-shaped adhesive deposits.

14. The process according to one or more of claims 1, wherein said step of bonding includes vacuum lamination.

15. The process of claim 1, wherein the laminated molded part is a part of a vehicle interior trim component.

* * * * *